(12) United States Patent
Lim

(10) Patent No.: US 6,183,370 B1
(45) Date of Patent: Feb. 6, 2001

(54) DUST CAP ASSEMBLY HAVING TWO SNAP RING SECURING MECHANISM IN A SLIP SPLINE ASSEMBLY

(75) Inventor: Chong-Kheng Lim, Loves Park, IL (US)

(73) Assignee: Rockford Powertrain, Inc., Rockford, IL (US)

( * ) Notice: Under 35 U.S.C. 154(b), the term of this patent shall be extended for 0 days.

(21) Appl. No.: 09/179,161

(22) Filed: Oct. 26, 1998

(51) Int. Cl.[7] ..................................................... F16D 3/06
(52) U.S. Cl. ........................... 464/162; 464/133; 464/134
(58) Field of Search .................. 403/DIG. 3, 2; 277/DIG. 7, 326, 327, 551, 925; 464/183, 133, 113, 135, 134, 162

(56) References Cited

U.S. PATENT DOCUMENTS

| | | |
|---|---|---|
| 2,116,290 | 5/1938 | Spicer . |
| 3,063,266 | 11/1962 | Rabson . |
| 3,400,558 | 9/1968 | Haines . |
| 3,854,231 * | 12/1974 | Broyles .................................. 42/28 |
| 3,952,658 * | 4/1976 | Broyles ................................. 102/438 |
| 4,475,737 | 10/1984 | Cook, Jr. et al. . |
| 4,936,336 * | 6/1990 | McCauley et al. .................. 137/296 |
| 5,078,533 | 1/1992 | Madonio et al. . |
| 5,141,014 * | 8/1992 | Poli et al. ................................. 403/2 |
| 5,299,982 | 4/1994 | Burton . |
| 5,417,613 | 5/1995 | Aiken . |
| 5,562,546 | 10/1996 | Koslowski et al. . |
| 5,634,853 | 6/1997 | Smith . |
| 5,716,276 * | 2/1998 | Mangas et al. ...................... 464/134 |
| 5,735,747 | 4/1998 | Gehrke et al. . |
| 5,797,800 | 8/1998 | Rhoades et al. . |
| 5,961,388 * | 10/1999 | Breidenbach et al. ............... 464/133 |

* cited by examiner

*Primary Examiner*—Lynne H. Browne
*Assistant Examiner*—Aaron M Dunwoody
(74) *Attorney, Agent, or Firm*—Leydig, Voit & Mayer, Ltd.

(57) ABSTRACT

A dust cover assembly for a slip spline assembly acts as a mechanical fuse in response to fluid pressure and includes a cup shaped dust cover and two snap rings for securing the dust cover in the yoke bore end of the slip spline assembly. The larger snap ring is fitted in an annular groove in the yoke while the smaller snap ring is fitted in an annular groove in cylindrical side wall of the dust cover. The groove in the side wall of the dust cover divides the side wall up into exposed and unexposed segments. By selecting the radial thicknesses of the groove in the side wall or the axial length of unexposed segment, the failure limit at which the dust cover pops out from the yoke due to pressures or forces in the yoke bore can be readily predicted. The dust cover assembly provides increased reliability of the slip spline assembly by providing a consistent pressure or load in the yoke bore which will cause the dust cover to release from the yoke and relieve the yoke bore pressure.

18 Claims, 4 Drawing Sheets

DUST CAP ASSEMBLY HAVING TWO SNAP RING SECURING MECHANISM IN A SLIP SPLINE ASSEMBLY

FIELD OF THE INVENTION

The invention relates generally to slip spline assemblies and more particularly to covers for closing the yoke bore ends of slip spline assemblies.

BACKGROUND OF THE INVENTION

Slip spline assemblies are used in heavy duty applications to transmit torque while allowing for axial translation between input and output components. A conventional slip spline assembly includes a slip yoke having a central longitudinal bore that receives a splined portion of a connection shaft. The internal splines of the yoke bore interfit with the splines of the shaft to provide for torque transfer between the yoke and the shaft while allowing for axial movement between the shaft and the yoke. Lubricant such as grease or other viscous fluid is often used and retained in the slip yoke bore to facilitate relatively smooth axial translation between the splined shaft and the slip yoke. The ends of the slip yoke bore are typically closed to maintain the lubricant within the bore and to prevent dust and other undesirable contaminants from entering the bore.

To close the open end of the yoke bore, slip spline assemblies are commonly provided with dust covers. Various connections and retaining mechanisms have been employed to retain the dust cover in the yoke bore end. When lubricant pressure excessively builds-up in the yoke bore due to sudden axial translations between the shaft and the yoke, it is desirable that the dust cover operate as a mechanical fuse and selectively fail to release the pressure build-up. Otherwise, excessive pressure build-up can impede movement between the shaft and yoke and result in damage to components either within the slip spline assembly or other external drive components associated with the input and output of the slip spline assembly.

Some of the attempts of retaining a dust cover include staking the dust cover with set screws to the yoke or welding the dust cover over the yoke bore. However, assembly of these connections have the drawback of being labor intensive. Moreover, replacement dust covers are not easily secured to the yoke bore after failure of the original dust cover. In particular, for the set screw retaining mechanism, the threads can become stripped which could require re-tapping or a completely new yoke. For the weld retaining mechanism, re-welding a replacement dust cover can cause strength problems in the yoke. FIG. 1 illustrates another prior attempt of closing the end 3 of a yoke bore 4 with a dust cover assembly 5. As illustrated in FIG. 1, the dust cover assembly 5 includes a cup shaped dust cover 6, a snap ring 7 and a resilient O-ring gasket 8. The dust cup 6 is stamped from sheet steel to provide an integral radially outward extending flange 9 that is retained by the snap ring fitted in groove 10 in the yolk bore end 3. The flange 9 also compresses the O-ring gasket 8 inserted in a second groove 11 in the yoke and forms a line seal.

A problem existing in the art is that these and other prior dust cover attempts have not achieved the sufficient failure reliability for many applications. In particular, prior dust covers that are mass produced do not fail or pop off at sufficiently consistent pressures in the yoke bore. Moreover, there has not beep a sufficiently reliable way to predict what pressure in the yoke bore will cause the dust cover to pop off. Prediction inaccuracies are amplified when the size and configuration of the dust cover are modified for the many different sizes and configurations of slip spline assemblies. This problem is further complicated by the fact that different applications using the same size and design of slip spline assembly may require different failure pressures in the yoke bore to pop the dust cover. Another drawback that sometimes occurs with some dust cover designs is that they rattle against the yoke due to vibrations in the yoke during operation of the slip spline assembly which in turn causes an undesirable noise.

SUMMARY OF THE INVENTION

It is therefore the general aim of the present invention to provide an improved way to retain dust covers in the open ends of slip yokes in slip spline assemblies.

It is therefore an object of the present invention to improve the consistency at which dust cover assemblies fail in slip spline assemblies due to pressure or other forces in the yoke bore of a slip spline assembly.

It is another object of the present invention to improve the reliability in predicting failure limits of dust cover assemblies for many different sizes and configurations of slip spline assemblies.

In achieving these above aims and objectives, it is a related object of the present invention to prevent rattling in a dust cover assembly caused by vibrations in the yoke during operation.

In achieving these above aims and objectives, it is a related object of the present invention to provide a dust cover assembly that is inexpensive and easy to assemble and replace into a yoke bore end.

The present invention is directed towards a dust cover assembly for closing a yoke bore end and of a slip spline assembly. The preferred embodiment of the dust cover assembly includes a cup shaped cover and two snap rings or other forms of rings for retaining the dust cover in the yoke bore end. The first snap ring engages the yoke while the second snap ring engages the dust cover. The first snap ring depends from the second snap ring to retain the dust cover in the yoke bore end. The dust cover assembly operates as a mechanical fuse and pops out of the yoke bore end at a predetermined pressure in the yoke bore.

In achieving the aforementioned aims and objectives, the smaller snap ring of the preferred embodiment is retained in an annular groove in the dust cover side wall while the larger snap ring is retained in an annular groove in the yoke. The smaller snap ring divides the dust cover side wall into an exposed segment and an unexposed segment. The radial thickness of the side wall at the groove or the axial length of the unexposed side wall segment can be used to predict the failure limit at which the dust cover pops out from the yoke due to fluid pressures or forces within the yoke bore. It is an advantage that the anticipated shear area during failure from pressure build-up in the yoke bore is located within the body of the side wall which improves the consistency and predictability of failure for mass produced dust cover assemblies.

It is an aspect of a preferred embodiment of the present invention that the yoke bore end defines an annular stepped configuration including cylindrical and radially planar walls that closely receive the dust cup and smaller snap ring. This stepped configuration in the yoke bore open end securely holds the dust cover in place thereby preventing the dust cover from rattling while achieving a relatively simple assembly and inexpensive dust cover design.

These and other aims, objectives, and features of the invention will become more apparent from the following detailed description when taken in conjunction with the accompanying drawings.

Figure 1:
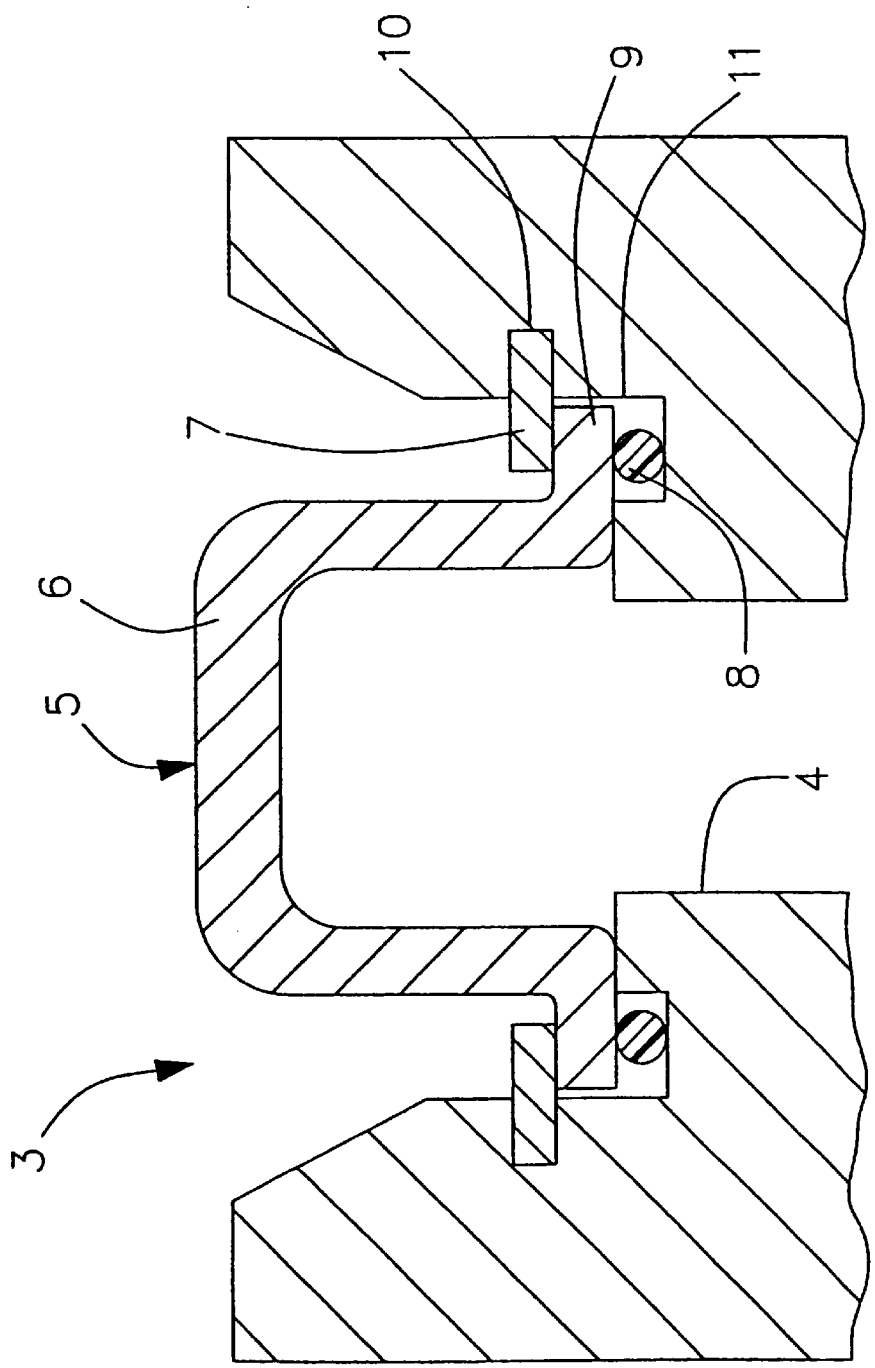
FIG. 1 is a prior art illustration of a dust cover assembly, illustrated in cross-section.

While the invention is susceptible of various modifications and alternative constructions, a certain illustrative embodiment thereof has been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 2:
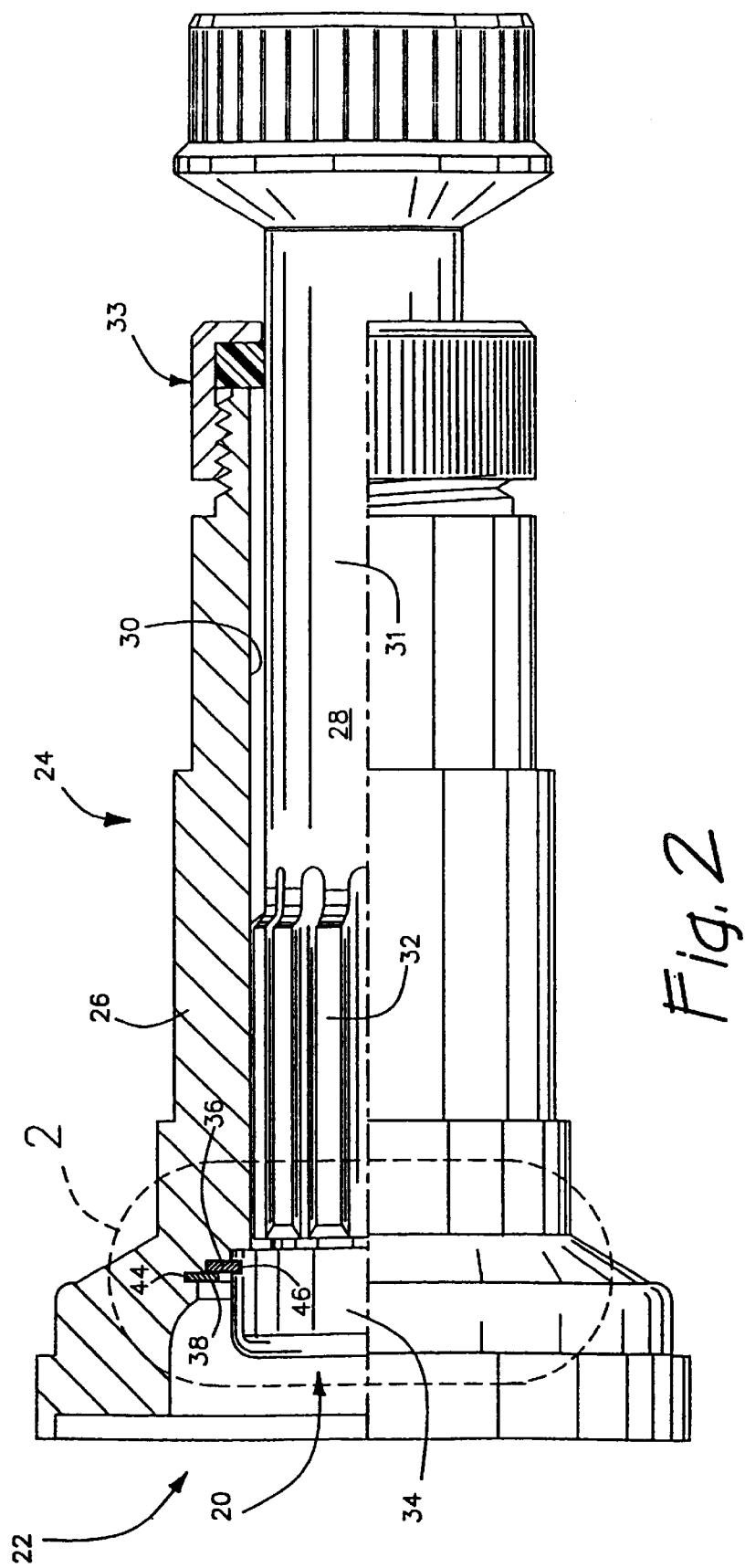
FIG. 2 is a cross-sectional view of a slip spline assembly including a dust cover assembly according to a preferred embodiment of the present invention.

Referring to FIG. 2, a dust cover assembly 20 retained in the yoke bore end 22 of a slip spline assembly 24 is illustrated in accordance with a preferred embodiment of the present invention. The slip spline assembly 24 generally includes a slip yoke 26 and a shaft 28. The slip yoke 26 has an internally splined longitudinally extending bore 30 slidably receiving an externally splined portion 32 of the shaft 28. The slip yoke 26 and shaft 28 can be conventionally connected to input and output drive components (not shown) in order to transfer torque therebetween while allowing for axial movement or misalignments between input and output drive components. To provide for smooth axially slippage between the shaft 28 and the slip yoke 26, the bore 30 is preferably filled with viscous lubricant such as grease. The dust cover assembly 20 covers the yoke bore end 22 to prevent contaminants such as dust, dirt or other foreign matter from interfering with the smooth translation between the shaft 28 and the slip yoke 26. At the other shaft end of the slip yoke 26, a conventional retainer seal assembly 33 including a cap and ring gasket is secured to the yoke 26 to prevent dust and contaminants from entering the yoke bore 30. The seal assembly 33 provides a relatively tight seal between the shaft 28 and the yoke to remove or scrape lubricant from the smooth portion 31 of the shaft 28 as the shaft 28 moves axially away from the yoke 26 and the smooth portion 31 exposes itself.

Figure 3:
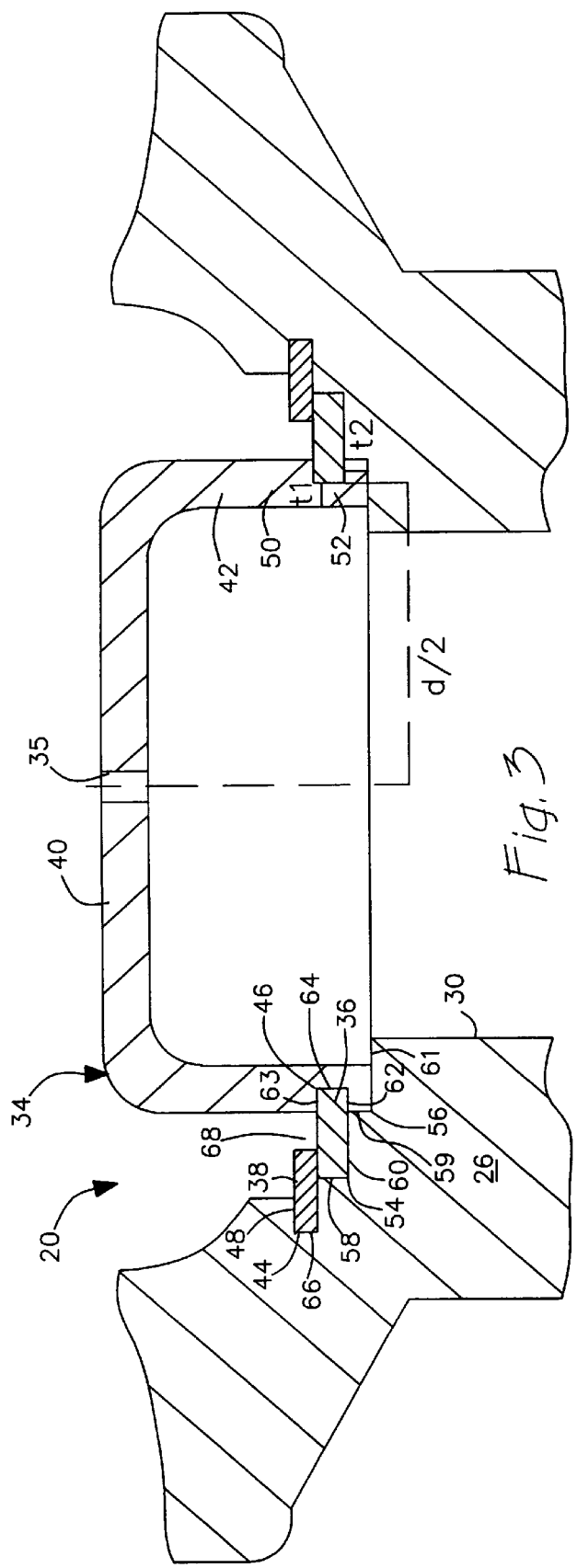
FIG. 3 is a fragmentary view of FIG. 2 taken about circle 2.

As illustrated in FIG. 3, the dust cover 34 preferably includes a breather hole 35 that releases air pressure build-up caused by most normal operating axial shifts between the shaft 28 and the slip yoke. The breather hole 35 is small enough to prevent most contaminants and larger contaminants from entering the yoke bore 30 and to prevent leakage of lubricant from the bore 30. However, the necessary small size of the breather hole 35 does not provide a quick enough release for sudden pressure build-ups in the yoke bore. High lubricant/grease pressures and/or air pressures may result from large sudden axial movements between the slip yoke 26 and the shaft 28, or if the yoke bore 30 is too full of lubricant.

In accordance with the invention and referring to FIG. 3, the preferred embodiment of the cover assembly 20 includes a cover 34 and two snap rings 36, 38 for retaining the cover 32 in the yoke bore end 22. The cover 32 is preferably cup-shaped having a flat closed end 40 integrally connected to a cylindrical or axially extending side wall 42. The larger diameter snap ring 38 is retained in an annular groove 44 defined in the yoke 26, while the smaller diameter ring 36 is retained in an annular groove 46 defined in the cover side wall 42. During pressure build-up in the yoke bore 30, the larger diameter snap ring 38 engages the wall 48 of the groove 46 with the smaller diameter snap ring 36 depending on the larger diameter snap ring 36 to thereby retain the cover 34 in the yoke bore end 22.

Figure 4:
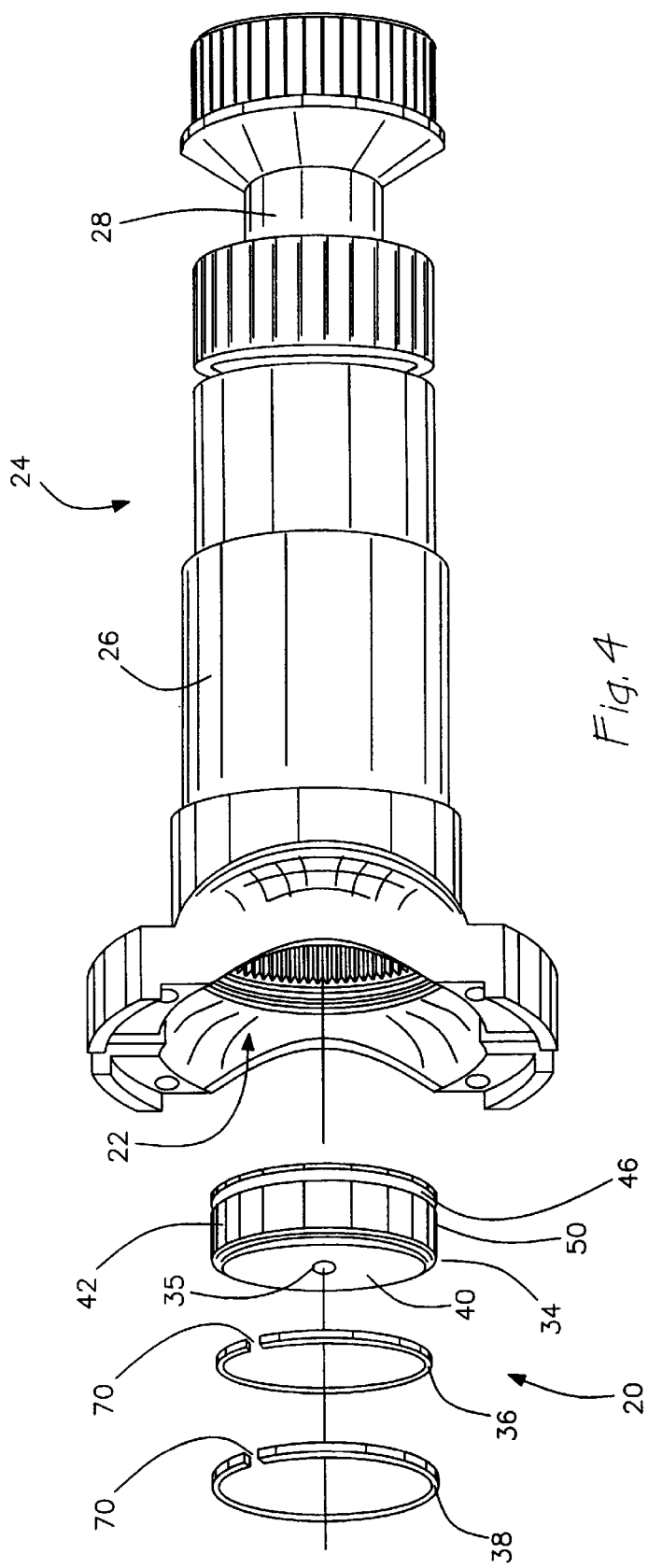
FIG. 4 is an exploded unassembled perspective view of the yoke and dust cover assembly shown in FIG. 2.

As shown in the FIGS. 2, 3 and 4 the annular groove 46 on the cover 34 divides the side wall 42 into exposed and unexposed segments 50, 52. When the dust cover assembly 20 fails, the snap rings 36, 38 partially flex and part of the unexposed segment 52 shears to allow the cover 34 to release or pop out of the yoke bore end 22. The dust cover 34 is preferably formed of metal or steel and allows the unexposed segment 52 to readily shear at a predetermined fluid pressure in the yoke bore. It is an advantage that the preferred embodiment reliably relieves excessive pressure build-up in the yoke bore 30 that could otherwise impede the axial movement between the shaft 28 and the slip yoke 26. By relieving excessive pressure build-up, the dust cover assembly 20 operates as a form of mechanical fuse to prevent damage to the slip spline assembly 24 and seal assembly 33, and/or to input and output components connected therewith during sudden axial jerks or movements. After failure of the original dust cover assembly 20, a replacement dust cover assembly including a new set of snap rings 36, 38 and a new dust cover 34 can be easily secured into the yoke bore end 22. Specialized tools are not necessary for inserting replacement dust cover assemblies.

Preferably, the dust cover assembly 20 is snugly fitted into the yoke bore end 22 in order to prevent the dust cover 34 from rattling during operation of the slip spline assembly 24. As illustrated best in FIG. 3, the yoke bore end 22 includes two annular stepped surfaces generally indicated at 54, 56 between the yoke groove 44 and the yoke bore 30. The outer step 54 includes a cylindrical surface 58 joined to a radially planar seating surface 60. The smaller snap ring 36 extends into the step 54 and is closely fitted therein to minimize the freedom of lateral and axial movement of the dust cover. The smaller snap ring 36 is also closely fitted in the side wall groove 46 between groove walls 62, 63 in contact with the groove bottom 62 to further minimize lateral and axial movement of the dust cover 34. Preferably, the smaller snap ring 36 is in continuous contact with both the seating surface 60 and the larger snap ring 38. Likewise, the unexposed segment 52 of the side wall 42 is closely received by the inner step 56 to provide a snug fit. Specifically, the inner step 56 includes a cylindrical surface 59 joined by a radially planar surface 61 to the yoke bore 30. The outer cylindrical periphery of the unexposed segment 52 runs adjacent in close proximity with the cylindrical surface 59 while the end face of the side wall is adjacent and in close proximity to the radially planar surface 61.

An advantage of the preferred embodiment is improved predictability and consistency at which dust cover assembly 20 fails due to pressure or other forces in the yoke bore 30. In the preferred embodiment, the line of least resistance usually determines the location where the side wall 42 will shear or fail. In particular and referring to FIG. 3, the radial thickness $t_1$ of the side wall 42 at the groove bottom 64 and the axial thickness $t_2$ of the unexposed segment 52 are locations which may be used to provide the line of least resistance, and which can be readily used to predict the pressure in the bore 30 that fails the dust cover assembly 20 causing the cover 34 to pop off the yoke bore end. The failure pressure can also be predicted with a high degree of reliability, roughly within about ±10%, which provides improved consistency among mass produced parts. In the preferred embodiment, the relationship for predicting the failure pressure can be controlled by the following equation:

$$F = \frac{Ssy * A}{n}$$

Wherein:
F=axial force applied to the dustcup (a product of pressure in the yoke bore and radial area of the dust cover)
Ssy=yield strength in shear of material used in side wall
n=constant based on factor of safety and experimental testing of dust cover assembly
A=cross-sectional area of critical stress area.

As mentioned above, the critical stress area or cross-sectional area A, is along the line of least resistance in the side wall indicated by broken lines $t_1$ and $t_2$ can be determined in the preferred embodiment by the lesser product of the following two equations:

$$A=\pi[(d/2)^2-(d/2-t_1)^2]$$

or $$A=\pi d t_2$$

Wherein:
d=diameter of annular groove bottom (shown in drawings).

In comparison with the prior art assembly of FIG. 1, the preferred embodiment has several advantages. One advantage is that the shear forces are carried in the body of the side wall 42, which causes the side wall 42 to shear at consistent pressures in the yoke bore 30. In the prior art assembly of FIG. 1, the radially outward flange 9 carries shear forces. During bore pressure build up, the flange 9 may bend and deform which can shift the location at which shear loads are carried and reduce the consistency at which bore pressures causes failure. Such bending in the flange 9 can also decrease reliability in predicting failure limits and create a looser connection. By carrying the shear loads in the side wall 42, which does not readily bend, the preferred embodiment prevents bending from creating failure inconsistencies. In several respects, the preferred embodiment of the present invention is also less expensive to fabricate because it does not require formation of the flange 9 or require an O-ring gasket 8 and associated groove. More precise tolerances among massed produced parts are also achieved by not having to form the flange 9, thereby also increasing reliability of failure consistencies and predictions in the preferred embodiment.

Another advantage of the preferred embodiment is its ease of manufacture and assembly which may best be seen with reference to FIG. 4. The dust cover 34 can be formed from steel preferably by stamping sheet steel into a cup shape and then forming the groove 46. The snap rings 36, 38 or other such acceptable rings are preferably formed of metal such as steel in a circular or other annular shape and preferably have a split 70 which makes them resilient enough to readily snap outward or inward into their respective grooves. To assembly the dust cover assembly 20 into the yoke bore open end 22, the smaller diameter snap ring 36 is first snapped into the groove 46 of the dust cover 34, preferably engaging the groove bottom 64. Then the dust cover 34 and snap ring 36 combination are slide axially into the yoke bore open end 22 with the snap ring 36 seated or abutted against the radial seating surface 60 of the yoke 26. Referring again to FIG. 3, the tolerance or space existing between the snap ring 36 and the cylindrical surface 58 of the yoke is preferably tight enough to prevent lateral movement of the dust cover 34 and free enough to allow easy insertion of the dust cover 34 and snap ring 36 combination. Likewise, the inner step 56 preferably closely receives the unexposed segment 52 of the dust cover side wall 42. To finish assembly, the larger diameter snap ring 38 is snapped into the yoke groove 44. The larger diameter snap ring preferably engages the groove bottom 66 and preferably urges the smaller snap ring 36 against the seating surface 60. The gap 68 between the side wall 42 and the yoke 26 is large enough to for easy insertion of the larger snap ring 38.

While several advantages have been disclosed above with the preferred embodiment utilizing two snap rings, certain claims appended hereto are meant to include other such retaining mechanism or means that will suggests themselves to those in the art for shearing the axially extending side wall 42 at a predetermined pressure in the yoke bore 30. These certain claims are directed broadly towards one of the significant features of the invention, namely, engaging the axially extending side wall 42 at a selected point during pressure build up in order to provide for improved reliability at which the dust cover 34 will release from the yoke bore end 22. The radial thickness or axial length of the unexposed side wall segment can be selected to determine the predetermined pressure at which the cover 34 will release. Such alternative embodiments may include for example a dust cover which is axially inserted into the yoke bore end then rotated to lock into the yoke bore end with a key locking the dust cover therein. Another alternative embodiment may include resilient legs or prongs which are built into the yoke bore end which allow the dust cover to snap into yoke bore end and which engage notches in the sidewall of the dust cover. Another alternative embodiment may include a dust cover of a resilient material such as plastic with a radially inward annular groove in the side wall that receives a radially inward shoulder of the yoke bore end, with the plastic sidewall shearing at a predetermined yoke bore pressure. These and other shearing and retaining means may suggest themselves to those skilled in the art and are meant to be within the scope of certain broad claims appended hereto.

Thus, there has been provided a dust cap assembly having a two snap ring securing mechanism in a slip spline assembly which fully satisfies the objects, aims, and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations that fall within the spirit and broad scope of the appended claims.

What is claimed is:
1. A slip spline assembly comprising:
a slip yoke having a longitudinal bore and a shaft slidably received in the bore for axial movement therein;
a first annular groove in the yoke;
a cover for closing an end of the yoke bore, the cover having a closed end and an axially extending side wall, the side wall including a second annular groove;

a first snap ring retained in the second annular groove; and a second snap ring of larger diameter than the first snap ring, the second snap ring retained in the first annular groove, the first snap ring depending on the second snap ring to retain the dust cup in the yoke bore end.

2. The slip spline assembly of claim 1 wherein the yoke bore includes an annular step including a radially extending seating surface joined by an axially extending annular surface to the first annular groove, the second snap ring being closely received in the annular step sufficient to prevent operational vibrations in the yoke from rattling the cover.

3. The slip spline assembly of claim 1 wherein an annular gap is defined between the second snap ring and the cover side wall.

4. The slip spline assembly of claim 1 wherein the second annular groove divides the side wall into exposed and unexposed segments, the unexposed segment shearing at a predetermined pressure in the yoke bore causing the cover to release from the yoke.

5. The slip spline assembly of claim 4 wherein the predetermined pressure is determined by at least one parameter selected from the group consisting of selected axial length of the unexposed segment and selected radial thickness of the side wall at the second annular groove.

6. A slip spline assembly comprising:

a yoke having a longitudinal bore terminating at an open end, the yoke having a first annular groove at the open end, the yoke further having an annular stepped surface between the yoke bore and the first groove, the stepped surface including a cylindrical surface joined to a radially extending seating surface;

a shaft slidably received in the yoke bore for axial movement therein;

a cover closing the open end having a flat closed end and a cylindrical side wall integrally connected to the closed end, the side wall having a second annular groove dividing the side wall into exposed and unexposed segments, the unexposed segment shearing away at a predetermined pressure in the yoke bore;

a first snap ring retained in the second annular groove and extending into the annular step, the first snap ring being seated on the seating surface and having an outer periphery running adjacent to the cylindrical surface; and a second snap ring of larger diameter than the first snap ring retained in the first annular groove and engaging the first snap ring to retain the cover in the open end.

7. The slip spline assembly of claim 6 wherein an annular gap is defined between the cover side wall and the second snap ring.

8. The slip spline assembly of claim 6 wherein the predetermined pressure is determined by at least one parameter selected from the group consisting of selected axial length of the unexposed segment and selected radial thickness of the side wall at the second annular groove.

9. The slip spline assembly of claim 6 further comprising a second annular stepped surface including a radially planar wall joining the yoke bore to a cylindrical wall, the radially planar wall running adjacent with the unexposed segment of the side wall.

10. The slip spline assembly of claim 6 wherein the flat closed end includes a breather hole.

11. A method of closing an open end of a yoke with a cover, the yoke having a longitudinally extending bore for slidably receiving a shaft comprising:

securing a first snap ring to a cover, the cover having a closed end and an axially extending side wall, the side wall including a first annular groove receiving the snap ring;

inserting the cover and first snap ring into the open end of the yoke, the snap ring resting on a radially extending seating surface of the yoke; and retaining the cover and first snap ring with a second snap ring, the second snap ring snapping into a second annular groove provided in the yoke at the open end.

12. The method of claim 11 further comprising the step forming the first groove on the side wall at a selected axial position to determine a selected pressure in the yoke bore that will cause the cover to release from the open end, wherein the groove divides the side wall into exposed and unexposed segments, the axial length of the unexposed segment determining the selected pressure.

13. The method of claim 11 further comprising the step of selecting the radial depth of the first groove to control the thickness of the side wall at the first groove and thereby determine a selected pressure in the yoke bore that will cause the cover to release from the open end.

14. A slip spline assembly comprising:

a slip yoke having a longitudinal bore terminating at an open end;

a shaft slidably received in the bore for axial movement therein;

a cover for closing the open end of the yoke bore, having a closed end and an axially extending side wall;

means for shearing the side wall at a predetermined pressure in the yoke at a selected point within the radial periphery of the axially extending side wall, said shearing means depending upon the yoke and engaging the side wall during pressure build up in the yoke bore to retain the cover over the open end.

15. The slip spline assembly of claim 14 wherein the selected point divides the axially extending side wall into exposed and unexposed segments, the axial length of the unexposed segment being preselected to determine said predetermined pressure.

16. The slip spline assembly of claim 14 wherein the side wall has a selected radial thickness at the selected point to determine said predetermined pressure.

17. The slip spline assembly of claim 14 wherein the axially extending side wall defines a groove receiving said shearing means.

18. The slip spline assembly of claim 17 wherein said shearing means comprising first and second snap rings, the second snap ring engaging the yoke, the first snap ring engaging the groove and depending on the second snap ring.

* * * * *